United States Patent
Shin et al.

(10) Patent No.: US 12,436,332 B2
(45) Date of Patent: Oct. 7, 2025

(54) OPTICAL LAMINATE AND OPTICAL DISPLAY APPARATUS COMPRISING THE SAME

(71) Applicant: SAMSUNG SDI CO., LTD., Yongin-si (KR)

(72) Inventors: Seung Mi Shin, Suwon-si (KR); Beom Deok Lee, Suwon-si (KR); Seong Hoon Lee, Suwon-si (KR); Seon Gyeong Jeong, Suwon-si (KR); A Ra Jo, Suwon-si (KR); Wan Taek Hong, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1049 days.

(21) Appl. No.: 17/484,413

(22) Filed: Sep. 24, 2021

(65) Prior Publication Data
US 2022/0099876 A1 Mar. 31, 2022

(30) Foreign Application Priority Data
Sep. 25, 2020 (KR) .................. 10-2020-0125260

(51) Int. Cl.
*G02B 5/30* (2006.01)
*G02B 1/14* (2015.01)
(Continued)

(52) U.S. Cl.
CPC .............. *G02B 5/3083* (2013.01); *G02B 1/14* (2015.01); *G02F 1/133634* (2013.01); *G02F 1/134363* (2013.01); *G02F 2413/13* (2013.01)

(58) Field of Classification Search
CPC ..... G02B 1/14; G02B 5/3083; G02F 1/13363; G02F 1/133634; G02F 2413/13
See application file for complete search history.

(56) References Cited

U.S. PATENT DOCUMENTS

| | | | | |
|---|---|---|---|---|
| 2006/0246231 A1* | 11/2006 | Koishi | ............... | C09K 19/3852 428/1.3 |
| 2007/0242188 A1* | 10/2007 | Sakai | .................. | G02B 5/3083 359/489.07 |

(Continued)

FOREIGN PATENT DOCUMENTS

| | | | | |
|---|---|---|---|---|
| CN | 110546538 A | | 12/2019 | |
| CN | 114252949 B | * | 8/2024 | ............. B32B 7/023 |

(Continued)

OTHER PUBLICATIONS

Chinese Office Action dated Jan. 12, 2024 issued in corresponding Chinese Patent Application No. 202111122774.8 (7 pages).

(Continued)

*Primary Examiner* — Sophie Hon
(74) *Attorney, Agent, or Firm* — Womble Bond Dickinson (US) LLP

(57) ABSTRACT

An optical laminate and an optical display apparatus including the same are provided. An optical laminate includes: a polarizer; and a first protective layer and a retardation layer stacked on a light incidence surface of the polarizer, the retardation layer including at least a positive C layer, and a laminate of the first protective layer and the retardation layer having a photoelastic coefficient of about $2 \times 10^{-13}$ cm²/dyne or less and a modulus of about 2,000 MPa to about 4,000 MPa, as measured in an absorption axis direction of the polarizer in the optical laminate.

18 Claims, 1 Drawing Sheet

(51) Int. Cl.
   *G02F 1/13363*   (2006.01)
   *G02F 1/1343*    (2006.01)

(56) References Cited

U.S. PATENT DOCUMENTS

| | | |
|---|---|---|
| 2018/0356679 A1 | 12/2018 | Lida et al. |
| 2019/0107657 A1 | 4/2019 | Jung et al. |
| 2019/0169388 A1 | 6/2019 | Kim et al. |

FOREIGN PATENT DOCUMENTS

| | | | | |
|---|---|---|---|---|
| JP | 2006-251659 A | | 9/2006 | |
| JP | 2020076968 A | * | 5/2020 | ............... G02B 1/04 |
| KR | 10-2006-0049143 | | 5/2006 | |
| KR | 10-2017-0122163 A | | 11/2017 | |
| KR | 10-2020-0092159 A | | 8/2020 | |
| KR | 102715185 B1 | * | 10/2024 | ............... G02B 1/04 |
| TW | 202031492 A | | 9/2020 | |
| WO | WO 2017/221405 A1 | | 12/2017 | |

OTHER PUBLICATIONS

Korean Office Action dated Dec. 26, 2023 issued in corresponding Korean Patent Application No. 10-2020-0125260 (5 pages).

\* cited by examiner

OPTICAL LAMINATE AND OPTICAL DISPLAY APPARATUS COMPRISING THE SAME

CROSS-REFERENCE TO RELATED APPLICATION

This application claims priority to and the benefit of Korean Patent Application No. 10-2020-0125260, filed on Sep. 25, 2020 in the Korean Intellectual Property Office, the entire disclosure of which is incorporated herein by reference.

1. FIELD

Aspects of embodiments of the present invention relate to an optical laminate and an optical display apparatus including the same.

2. DESCRIPTION OF THE RELATED ART

As one of liquid crystal displays, there is an in-plane switching (IPS) mode liquid crystal display. In the IPS mode liquid crystal display, nematic liquid crystals homogeneously aligned with no electric field applied thereto are driven by application of a lateral electric field to display an image. The IPS mode liquid crystal display has an advantage of a broader viewing angle than liquid crystal displays for other driving modes.

The IPS mode liquid crystal display has a problem of low contrast ratio at opposite angles due to inclination of liquid crystals. Accordingly, the IPS mode liquid crystal display includes a positive C layer in a viewer-side polarizing plate to improve the contrast ratio at the opposite angles. Upon assembly of the viewer-side polarizing plate to a liquid crystal panel, with the viewer-side polarizing plate attached to a light exit surface of the liquid crystal panel, stress is applied to an upper surface of the viewer-side polarizing plate. In this process, mura can be generated on the liquid crystal panel, thereby causing deterioration in screen quality of an optical display apparatus.

The background technique of the present invention is disclosed in Japanese Unexamined Patent Publication No. 2006-251659 and the like.

SUMMARY

According to an aspect of embodiments of the present invention, an optical laminate that improves contrast ratio at opposite angles while suppressing light leakage when applied to a panel of an optical display apparatus is provided.

According to another aspect of embodiments of the present invention, an optical laminate that minimizes or reduces generation of mura due to stress applied to a panel of an optical display apparatus upon assembly of the optical laminate thereto is provided.

According to another aspect of embodiments of the present invention, an optical laminate that minimizes or reduces generation of bending is provided.

According to one or more embodiments of the present invention an optical laminate includes: a polarizer; and a first protective layer and a retardation layer stacked on a light incidence surface of the polarizer, wherein the retardation layer includes at least a positive C layer, and a laminate of the first protective layer and the retardation layer has a photoelastic coefficient of about $2 \times 10^{-13}$ cm$^2$/dyne or less and a modulus of about 2,000 MPa to about 4,000 MPa, as measured in an absorption axis direction of the polarizer in the optical laminate.

In one or more embodiments, the first protective layer and the retardation layer may be sequentially stacked on the light incidence surface of the polarizer.

In one or more embodiments, the laminate of the first protective layer and the retardation layer may have a modulus variation rate of about −3% to about 0%, as calculated according to the following Equation 1:

$$\text{Modulus variation rate} = \{(B-A)/A\} \times 100,$$

where A denotes the modulus of the laminate of the first protective layer and the retardation layer in the absorption axis direction of the polarizer, and B denotes a modulus of the laminate of the first protective layer and the retardation layer in the absorption axis direction of the polarizer, as measured after being left at 105° C. for 1 hour.

In one or more embodiments, the laminate of the first protective layer and the retardation layer may have an out-of-plane retardation of about −200 nm to about 0 nm at a wavelength of 550 nm.

In one or more embodiments, the laminate of the first protective layer and the retardation layer may have an in-plane retardation of about 20 nm or less at a wavelength of 550 nm.

In one or more embodiments, the positive C layer may have an out-of-plane retardation Rth of about −200 nm to about 0 nm at a wavelength of 550 nm.

In one or more embodiments, the positive C layer may have an in-plane retardation of about 20 nm or less at a wavelength of 550 nm.

In one or more embodiments, the positive C layer may include a liquid crystal layer or a non-liquid crystal coating layer.

In one or more embodiments, the non-liquid crystal coating layer may include at least one selected from among a cellulose ester compound or a polymer thereof and an aromatic compound or a polymer thereof.

In one or more embodiments, the first protective layer may have an out-of-plane retardation of about −5 nm or less at a wavelength of 550 nm.

In one or more embodiments, the first protective layer may have an in-plane retardation of about 0 nm to about 20 nm at a wavelength of 550 nm.

In one or more embodiments, the first protective layer may include a triacetylcellulose resin film or an acryl resin film.

In one or more embodiments, an angle defined between an absorption axis of the polarizer and a slow axis of the first protective layer may be about 80° to about 95°.

In one or more embodiments, the slow axis of the first protective layer may be a transverse direction (TD) of the first protective layer.

In one or more embodiments, the polarizing plate may further include a second protective layer stacked on a light exit surface of the polarizer.

In one or more embodiments, the second protective layer may have an in-plane retardation of about 5,000 nm or more at a wavelength of 550 nm.

In one or more embodiments, the polarizing plate may further include a third protective layer stacked on the light incidence surface of the polarizer.

In one or more embodiments, the third protective layer may exhibit positive A optical characteristics.

In one or more embodiments, the third protective layer may include at least one selected from a protective film, a protective coating layer, and a liquid crystal panel.

According to one or more embodiments of the present invention, an optical display apparatus includes the optical laminate according to an embodiment of the present invention.

Embodiments of the present invention provide an optical laminate that improves contrast ratio at opposite angles while suppressing light leakage when applied to a panel of an optical display apparatus.

Further, embodiments of the present invention provide an optical laminate that minimizes or reduces generation of mura due to stress applied to a panel of an optical display apparatus upon assembly of the optical laminate thereto.

Further, embodiments of the present invention provide an optical laminate that minimizes or reduces generation of bending.

DETAILED DESCRIPTION

Figure 1:
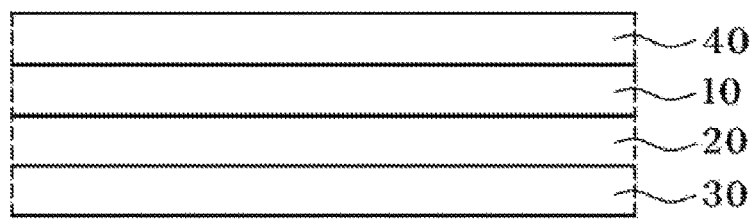
FIG. 1 is a cross-sectional view of an optical laminate according to an embodiment of the present invention.

Herein, some embodiments of the present invention will be described in detail with reference to the accompanying drawings to provide a thorough understanding of the invention to those skilled in the art. It is to be understood that the present invention may be embodied in different ways and is not limited to the following embodiments.

In the drawings, components unrelated to the description may be omitted for clear description of the invention, and like components will be denoted by like reference numerals throughout the specification. Although lengths, thicknesses, or widths of various components may be exaggerated for understanding in the drawings, the present invention is not limited thereto.

Herein, spatially relative terms, such as "upper" and "lower," are defined with reference to the accompanying drawings. Thus, it is to be understood that the term "upper surface" can be used interchangeably with the term "lower surface," for example. Further, when an element, such as a layer or a film, is referred to as being placed "on" another element, it may be directly placed on the other element, or one or more intervening elements may be present. On the other hand, when an element is referred to as being "placed directly on," "placed immediately on," "directly formed on," or "formed to directly contact" another element, there are no intervening element(s) therebetween.

Herein, "in-plane retardation Re," "out-of-plane retardation Rth," and "degree of biaxiality (NZ)" are represented by the following Equations A, B, and C, respectively:

$$Re=(nx-ny)\times d, \quad \text{Equation A}$$

$$Rth=((nx+ny)/2-nz)\times d, \quad \text{Equation B}$$

$$NZ=(nx-nz)/(nx-ny), \quad \text{Equation C}$$

where, in Equations A, B, and C, nx, ny, and nz are indexes of refraction of a corresponding optical device in the x-axis direction, the y-axis direction, and the thickness direction of the optical device at a measurement wavelength, respectively, and d is the thickness thereof (unit: nm).

Herein, "photoelastic coefficient" may be a value measured at 25° C. and at a wavelength of 550 nm.

Herein, "modulus" means tensile modulus at 25° C. A method of measuring tensile modulus is described in further detail in the experimental example described below.

Herein, "(meth)acryl" means acryl and/or methacryl.

As used herein to represent a specific numerical range, the expression "X to Y" means "greater than or equal to X and less than or equal to Y."

An optical laminate according to the present invention can improve contrast ratio at opposite angles while suppressing light leakage when applied to a panel of an optical display apparatus, particularly an IPS mode liquid crystal panel thereof. The optical laminate according to the present invention can minimize or reduce generation of mura while suppressing generation of bending at high temperature when stress is applied to the panel in a perpendicular direction upon assembly of the optical laminate thereto. In particular, the optical laminate according to the present invention can realize the above effects in a large-area optical display apparatus.

An optical laminate according to one or more embodiments of the present invention includes: a polarizer; and a first protective layer and a retardation layer stacked on a light incidence surface of the polarizer, wherein the retardation layer includes at least a positive C layer, and a laminate of the first protective layer and the retardation layer has a photoelastic coefficient of about $2\times10^{-13}$ cm$^2$/dyne or less and a modulus of about 2,000 MPa to about 4,000 MPa, as measured in an absorption axis direction of the polarizer in the optical laminate.

Herein, an optical laminate according to an embodiment of the present invention will be described with reference to FIG. 1.

Referring to FIG. 1, the optical laminate includes a polarizer 10, a first protective layer 20, a retardation layer 30, and a second protective layer 40.

The first protective layer 20 and the retardation layer 30 are sequentially stacked on a lower surface of the polarizer 10 (on a light incidence surface of the polarizer). The second protective layer 40 is stacked on an upper surface of the polarizer 10 (on a light exit surface of the polarizer).

Although FIG. 1 shows that the first protective layer 20 and the retardation layer 30 are sequentially stacked on the lower surface of the polarizer 10 (on the light incidence surface of the polarizer), the retardation layer and the first protective layer may be sequentially stacked on the lower surface of the polarizer 10 in other embodiments.

Although not shown in FIG. 1, the optical laminate may be disposed on a light exit surface of a panel of an optical display apparatus to be used as a viewer-side optical laminate when stacked on the panel of the optical display apparatus.

Retardation Layer

The retardation layer 30 includes at least a positive C layer. The positive C layer can improve contrast ratio at opposite angles while suppressing light leakage when applied to a panel of an optical display apparatus, and, in an embodiment, an IPS mode panel.

The positive C layer means a positive uniaxial layer having an optical axis in a normal direction, in which nx and ny are substantially the same. In terms of index of refraction, the positive C layer means a retardation layer satisfying a relation: nz>nx=ny, where nx, ny, and nz are the indexes of refraction of the positive C plate layer in the slow axis direction, the fast axis direction, and the thickness direction thereof at a wavelength of 550 nm, respectively.

In an embodiment, the positive C layer may have an out-of-plane retardation Rth of about −200 nm to about 0 nm at a wavelength of 550 nm, and, in an embodiment, about −200 nm to less than about 0 nm, and, in an embodiment, about −180 nm to about −5 nm, and, in an embodiment, about −150 nm to about −50 nm, and, in an embodiment, about −90 nm to about −75 nm. Within this range, the positive C layer can improve contrast ratio at opposite angles while suppressing light leakage.

For example, the positive C layer may have an out-of-plane retardation Rth of about −200 nm, about −195 nm, about −190 nm, about −185 nm, about −180 nm, about −175 nm, about −170 nm, about −165 nm, about −160 nm, about −155 nm, about −150 nm, about −145 nm, about −140 nm, about −135 nm, about −130 nm, about −125 nm, about −120 nm, about −115 nm, about −110 nm, about −105 nm, about −100 nm, about −95 nm, about −90 nm, about −85 nm, about −80 nm, about −75 nm, about −70 nm, about −65 nm, about −60 nm, about −55 nm, about −50 nm, about −45 nm, about −40 nm, about −35 nm, about −30 nm, about −25 nm, about −20 nm, about −15 nm, about −10 nm, about −5 nm, or about 0 nm at a wavelength of 550 nm.

In an embodiment, the positive C layer may have an in-plane retardation Re of about 20 nm or less at a wavelength of 550 nm, and, in an embodiment, about 0 nm to about 20 nm, and, in an embodiment, about 0 nm to about 10 nm. Within this range, the positive C layer can easily achieve the above out-of-plane retardation. For example, the positive C layer may have an in-plane retardation Re of about 20 nm, about 19 nm, about 18 nm, about 17 nm, about 16 nm, about 15 nm, about 14 nm, about 13 nm, about 12 nm, about 11 nm, about 10 nm, about 9 nm, about 8 nm, about 7 nm, about 6 nm, about 5 nm, about 4 nm, about 3 nm, about 2 nm, about 1 nm, or about 0 nm at a wavelength of 550 nm.

In an embodiment, the positive C layer may have a thickness of greater than about 0 μm to about 20 μm, and, in an embodiment, about 0.001 μm to about 20 μm, and, in an embodiment, about 0.01 μm to about 20 μm, and, in an embodiment, about 1 μm to about 10 μm. Within this range, the positive C layer can be used in the optical laminate.

For example, the positive C layer may have a thickness of about 0.001 μm, about 0.002 μm, about 0.003 μm, about 0.004 μm, about 0.005 μm, about 0.006 μm, about 0.007 μm, about 0.008 μm, about 0.009 μm, about 0.01 μm, about 0.02 μm, about 0.03 μm, about 0.04 μm, about 0.05 μm, about 0.06 μm, about 0.07 μm, about 0.08 μm, about 0.09 μm, about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, or about 20 μm.

The positive C layer may be formed of any material and may have any shape so long as the positive C layer can exhibit the above optical properties. In order to achieve thickness reduction and the above out-of-plane retardation of the optical laminate, the positive C layer may be realized by a coating layer formed by depositing a low molecular weight or high molecular weight non-liquid crystal compound or a composition comprising the same on a transparent support, followed by drying, or may be a liquid crystal layer formed by depositing or transferring a low molecular weight or high molecular weight liquid crystalline compound onto a transparent support. In an embodiment, the positive C layer is a non-liquid crystal coating layer in terms of easy achievement of the above out-of-plane retardation and easy formation of the positive C layer.

The coating layer may be formed of any low molecular weight or high molecular weight non-liquid crystal compound so long as the coating layer can realize the above out-of-plane retardation.

In an embodiment, a low molecular weight or high molecular weight non-liquid crystal polymer may be formed of a composition containing at least one selected from among a cellulose ester compound or a polymer thereof and an aromatic compound or a polymer thereof described below in further detail. The positive C layer may contain at least one selected from among the cellulose ester compound or a polymer thereof and the aromatic compound or a polymer thereof. The cellulose ester compound or a polymer thereof and the aromatic compound or a polymer thereof may be suitable for manufacture of the positive C layer according to the present invention.

The cellulose ester compound may include at least one selected from among a cellulose ester resin, a cellulose ester oligomer, and a cellulose ester monomer.

The cellulose ester compound may include a condensation product obtained through reaction between a hydroxyl group on a cellulose ester and carboxylic acid or carboxylic anhydride.

The cellulose ester compound may be regioselectively or randomly substituted. Regioselectivity may be measured by determining a relative degree of substitution at the positions of C6, C3, and C2 on the cellulose ester by carbon 13 NMR. The cellulose ester compound may be prepared by a typical method through contact between a cellulose solution and at least one $C_1$ to $C_{20}$ acylation agent for a sufficient contact time to provide a cellulose ester having a desired degree of substitution and a desired degree of polymerization.

In an embodiment, the acylation agent includes at least one linear or branched C1 to C20 alkyl or aryl carboxylic anhydride, carboxylic acid halide, diketone, or acetoacetic ester. Examples of the carboxylic anhydride may include acetic anhydride, propionic anhydride, butyric anhydride, isobutyric anhydride, valeric anhydride, hexanoic anhydride, 2-ethylhexanoic anhydride, nonanoic anhydride, lauric anhydride, palmitic anhydride, stearic anhydride, benzoic anhydride, substituted benzoic anhydride, phthalic anhydride, and isophthalic anhydride. Examples of the carboxylic acid halide may include acetyl, propionyl, butyryl, hexanoyl, 2-ethylhexanoyl, lauroyl, palmitoyl, benzoyl, substituted benzoyl, and stearoyl chlorides. Examples of the acetoacetic ester may include methyl acetoacetate, ethyl acetoacetate, propyl acetoacetate, butyl acetoacetate, and tertiary butyl acetoacetate. In an embodiment, the acylation agent includes linear or branched $C_2$ to $C_9$ alkyl carboxylic acid anhydrides, such as acetic anhydride, propionic anhydride, butyric anhydride, 2-ethylhexanoic anhydride, nonanoic anhydride, and stearic anhydride.

In an embodiment, the cellulose ester compound includes, for example, any of cellulose acetate (CA), cellulose acetate propionate (CAP), and cellulose acetate butyrate (CAB), without being limited thereto.

In an embodiment, the cellulose ester compound may include at least two acyl group substituents. At least one of the acyl groups may include an aromatic substituent and, in the cellulose ester compound, a relative degree of substitution (RDS) may be set in the order of C6>C2>C3. C6 means a degree of substitution at the position of the number 6 carbon in the cellulose ester, C2 means a degree of substitution at the number 2 carbon in the cellulose ester, and C3 means a degree of substitution at the number 3 carbon in the cellulose ester. The aromatic compound may include benzoate or substituted benzoate.

In another embodiment, the cellulose ester compound may include a regioselectively substituted cellulose ester compound having (a) a plurality of chromophore-acyl substituents and (b) a plurality of pivaloyl substituents.

The cellulose ester compound may have a degree of hydroxyl group substitution of about 0.1 to about 1.2 and a degree of chromophore-acyl substitution of about 0.4 to about 1.6; a difference between a total sum of the degree of chromophore-acyl substitution at the number 2 carbon in the cellulose ester compound and the degree of chromophore-acyl substitution at the number 3 carbon in the cellulose ester compound and the degree of chromophore-acyl substitution at the number 6 carbon in the cellulose ester compound may be in a range from about 0.1 to about 1.6; and the chromophore-acyl may be selected from among the following (i), (ii), (iii), and (iv).

(i) ($C_6$ to $C_{20}$)aryl-acyl, where aryl is unsubstituted or substituted with 1 to 5 $R^1$s.

(ii) hetero-aryl, where hetero-aryl is a five to ten-membered ring having 1 to 4 hetero atoms selected from among N, O, and S, and is unsubstituted or substituted with 1 to 5 $R^1$s.

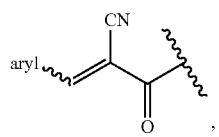
(iii)

where aryl is a $C_1$ to $C_6$ aryl and is unsubstituted or substituted with 1 to 5 $R^1$s.

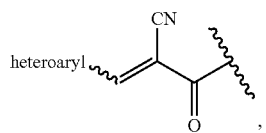
(iv)

where heteroaryl is a five to ten-membered ring having 1 to 4 hetero atoms selected from among N, O, and S, and is unsubstituted or substituted with 1 to 5 $R^1$s, $R^1$s being each independently nitro, cyano, ($C_1$ to $C_6$)alkyl, halo($C_1$ to $C_6$)alkyl, (C6 to C20)aryl-$CO_2$-, ($C_6$ to $C_{20}$)aryl, ($C_1$ to $C_6$)alkoxy, halo($C_1$ to $C_6$)alkoxy, halo, five to ten-membered heteroaryl having 1 to 4 hetero atoms selected from among N, O, and S, or

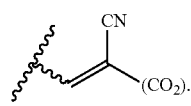

In an embodiment, the chromophore-acyl may be unsubstituted or substituted benzoyl or unsubstituted or substituted naphthyl.

In an embodiment, the chromophore-acyl may be selected from the group consisting of:

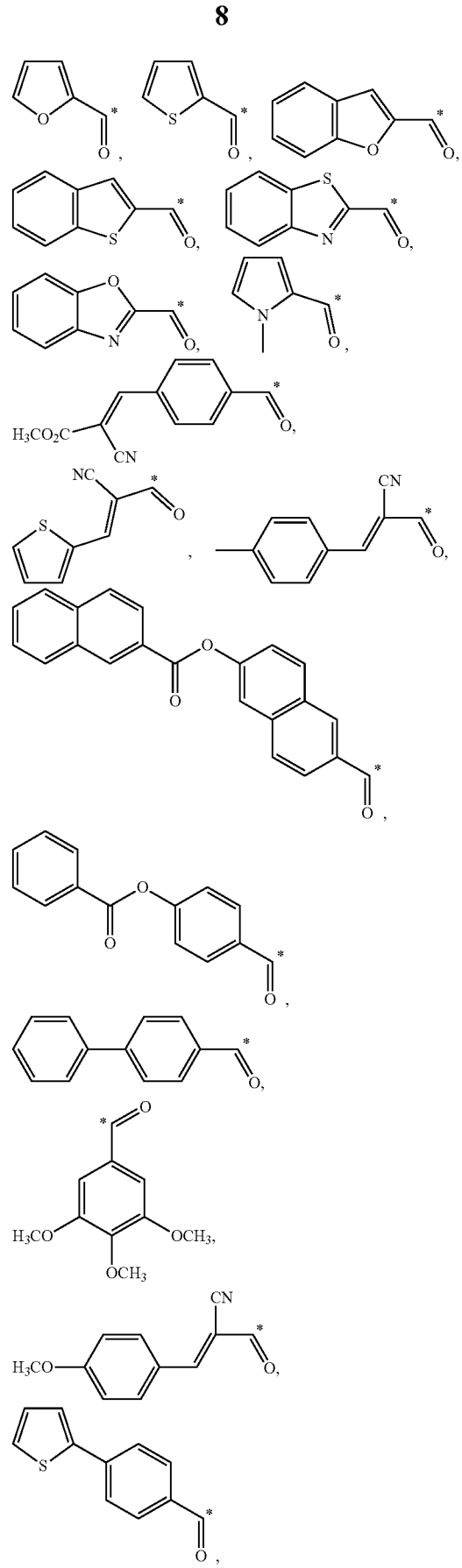

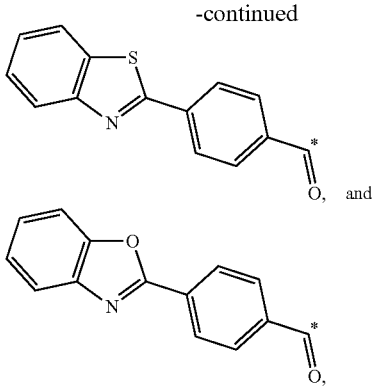

where * indicates a linking site of the chromophore-acyl substituent to oxygen of the cellulose ester.

In another embodiment, the cellulose ester compound may include an ester polymer having an acyl unit, in which at least some hydroxyl groups [a $C_2$ hydroxyl group, a $C_3$ hydroxyl group or a $C_6$ hydroxyl group] of a sugar monomer constituting cellulose are unsubstituted or substituted, as represented by the following Formula 1:

Formula 1

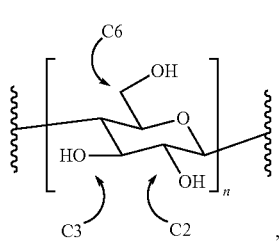

where, in Formula 1, n is an integer of 1 or more.

A substituent group for the cellulose ester polymer or the acyl unit may include at least one selected from among a halogen, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), an acyl group, and a halogen-containing functional group. The substituent groups may be the same as or different from each other.

Herein, "acyl" may mean R—C(=O)—* (* being a linking site, R being a $C_1$ to $C_{20}$ alkyl group, a $C_3$ to $C_{20}$ cycloalkyl group, a $C_6$ to $C_{20}$ aryl group, or a $C_7$ to $C_{20}$ arylalkyl group), as well-known in the art. The "acyl" is coupled to a ring of the cellulose through ester bonding (through an oxygen atom) in the cellulose.

Here, "alkyl," "alkenyl," "cycloalkyl," "aryl," "heteroaryl," "alkoxy," and "acyl" refer to non-halogen based compounds for convenience. The composition for the retardation layer may include the cellulose ester polymer alone or a mixture including the cellulose ester polymer.

Here, "halogen" means fluorine (F), Cl, Br, or I, and, in an embodiment, F.

The "halogen-containing functional group" is an organic functional group containing at least one halogen and may include an aromatic, aliphatic, or alicyclic functional group. For example, the halogen-containing functional group may mean a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted acyl group, a halogen-substituted $C_6$ to $C_{20}$ aryl group, or a halogen-substituted $C_7$ to $C_{20}$ arylalkyl group, without being limited thereto.

The "halogen-substituted acyl group" may be R'—C(=O)—* (* being a linking site, R' being a halogen-substituted $C_1$ to $C_{20}$ alkyl group, a halogen-substituted $C_3$ to $C_{20}$ cycloalkyl, a halogen-substituted $C_6$ to $C_{20}$ aryl, or a halogen-substituted $C_7$ to $C_{20}$ arylalkyl). The "halogen-substituted acyl group" may be coupled to a ring of the cellulose through ester bonding (through an oxygen atom) in the cellulose.

In an embodiment, the composition includes a cellulose ester polymer substituted with an acyl group, a halogen, or a halogen-containing functional group. In an embodiment, the halogen is fluorine.

For formation of the positive C layer, the cellulose ester polymer may be prepared by a typical method known to those skilled in the art or may be obtained from commercially available products. For example, the cellulose ester polymer having an acyl group as a substituent group may be prepared by reacting trifluoroacetic acid or trifluoroacetic anhydride with the sugar monomer constituting the cellulose represented by Formula 1 or a polymer of the sugar monomer, by reacting trifluoroacetic acid or trifluoroacetic anhydride therewith, followed by additionally reacting an acylation agent (for example, an anhydride of carboxylic acid, or carboxylic acid) therewith, or by reacting both trifluoroacetic acid or trifluoroacetic anhydride and the acylation agent therewith.

The aromatic compound includes a phenyl group and may include a polystyrene compound or a fluorobenzene or difluorostyrene structure, without being limited thereto. In an embodiment, the polystyrene compound may include a moiety represented by the following Formula 2:

Formula 2

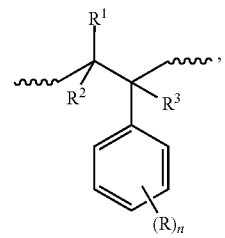

where, in Formula 2, ⁓⁓⁓* is a linking site of an atom, $R^1$, $R^2$, and $R^3$ are each independently a hydrogen atom, an unsubstituted alkyl group, a substituted alkyl group, or a halogen; Rs are each independently a substituent group on a styrene ring; and n is an integer of 0 to 5 indicating the number of substituent groups on the styrene ring.

Examples of the substituent group R on the styrene ring may include an alkyl group, a substituted alkyl group, a halogen, a hydroxyl group, a carboxyl group, a nitro group, an alkoxy group, an amino group, a sulfonate group, a phosphate group, an acyl group, an acyloxy group, a phenyl group, an alkoxycarbonyl group, and a cyano group.

The moiety of Formula 2 may contain a halogen.

In an embodiment, at least one of $R^1$, $R^2$ and $R^3$ may be hydrogen or a halogen, and, in an embodiment, hydrogen or fluorine.

In an embodiment, the retardation layer 30 may further include an optically transparent support layer or the like in addition to the positive C layer.

In an embodiment, the retardation layer 30 may be constituted by the positive C layer alone.

In another embodiment, the retardation layer 30 may include the positive C layer and the transparent support layer stacked on at least one surface of the positive C layer. The transparent support layer may include a typical optically transparent optical laminate well-known to those skilled in the art. In an embodiment, the retardation layer 30 may have an out-of-plane retardation of about −200 nm to about 0 nm at a wavelength of 550 nm, and, in an embodiment, about −200 nm to less than about 0 nm, and, in an embodiment, about −180 nm to about −5 nm, and, in an embodiment, about −150 nm to about −50 nm, and, in an embodiment, about −90 nm to about −75 nm, and an in-plane retardation of about 20 nm or less at a wavelength of 550 nm, and, in an embodiment, about 0 nm to about 20 nm, and, in an embodiment, about 0 nm to about 10 nm. Within this range, the retardation layer 30 can realize the above effects.

For example, the retardation layer 30 may have an out-of-plane retardation of about −200 nm, about −195 nm, about −190 nm, about −185 nm, about −180 nm, about −175 nm, about −170 nm, about −165 nm, about −160 nm, about −155 nm, about −150 nm, about −145 nm, about −140 nm, about −135 nm, about −130 nm, about −125 nm, about −120 nm, about −115 nm, about −110 nm, about −105 nm, about −100 nm, about −95 nm, about −90 nm, about −85 nm, about −80 nm, about −75 nm, about −70 nm, about −65 nm, about −60 nm, about −55 nm, about −50 nm, about −45 nm, about −40 nm, about −35 nm, about −30 nm, about −25 nm, about −20 nm, about −15 nm, about −10 nm, about −5 nm, or about 0 nm at a wavelength of 550 nm.

For example, the retardation layer 30 may have an in-plane retardation of about 20 nm, about 19 nm, about 18 nm, about 17 nm, about 16 nm, about 15 nm, about 14 nm, about 13 nm, about 12 nm, about 11 nm, about 10 nm, about 9 nm, about 8 nm, about 7 nm, about 6 nm, about 5 nm, about 4 nm, about 3 nm, about 2 nm, about 1 nm, or about 0 nm at a wavelength of 550 nm.

In an embodiment, although not shown in FIG. 1, an adhesive layer or a bonding layer may be formed on a lower surface of the retardation layer 30 to allow adhesion of the optical laminate to the panel of the optical display apparatus.

Laminate of First Protective Layer and Retardation Layer

As described above, the retardation layer 30 can improve contrast ratio at opposite angles while suppressing light leakage. However, the retardation layer formed in the form of the coating layer can generate mura upon assembly of the optical laminate to the panel of the optical display apparatus. That is, stress is applied to the panel of the optical display apparatus at an optical laminate side in order to secure the optical laminate to the panel, after bonding the optical laminate to a viewer side of the panel. In this process, the retardation layer can generate mura in the panel. Although a method of adjusting the photoelastic coefficient of the retardation layer alone can be considered, this method has a limitation in suppression of mura.

According to the present invention, the laminate of the first protective layer 20 and the retardation layer 30 may have a photoelastic coefficient of about $2 \times 10^{-13}$ cm$^2$/dyne or less and a modulus of about 2,000 MPa to about 4,000 MPa, as measured in an absorption axis direction of the polarizer in the optical laminate. When the laminate has both the photoelastic coefficient and the modulus within these ranges, the optical laminate can suppress generation of mura and bending at high temperature under stress applied to the panel of the optical display apparatus upon assembly to the panel of the optical display apparatus.

The "absorption axis of the polarizer" may mean the machine direction (MD) of the polarizer. The inventors of the present invention confirmed that, when the laminate satisfies the above photoelastic coefficient and a modulus of about 2,000 MPa to about 4,000 MPa, as measured in the absorption axis direction of the polarizer, the optical laminate can suppress generation of mura and bending at high temperature under stress applied to the panel of the optical display apparatus upon assembly to the panel of the optical display apparatus. For example, the laminate may have a modulus of about 2,000 MPa, about 2,100 MPa, about 2,200 MPa, about 2,300 MPa, about 2,400 MPa, about 2,500 MPa, about 2,600 MPa, about 2,700 MPa, about 2,800 MPa, about 2,900 MPa, about 3,000 MPa, about 3,100 MPa, about 3,200 MPa, about 3,300 MPa, about 3,400 MPa, about 3,500 MPa, about 3,600 MPa, about 3,700 MPa, about 3,800 MPa, about 3,900 MPa, or about 4,000 MPa.

In an embodiment, the laminate of the first protective layer 20 and the retardation layer 30 may have a photoelastic coefficient of about $0 \times 10^{-13}$ cm$^2$/dyne to about $2 \times 10^{-13}$ cm$^2$/dyne, and, in an embodiment, about $0.1 \times 10^{-13}$ cm$^2$/dyne to about $2 \times 10^{-13}$ cm$^2$/dyne. In an embodiment, the laminate of the first protective layer 20 and the retardation layer 30 may have a modulus of about 2,000 MPa to about 3,500 MPa, and, in an embodiment, about 2,000 MPa to about 3,000 MPa, as measured in the absorption axis direction of the polarizer in the optical laminate.

For example, the laminate of the first protective layer 20 and the retardation layer 30 may have a photoelastic coefficient of about $0 \times 10^{-13}$ cm$^2$/dyne, about $0.1 \times 10^{-13}$ cm$^2$/dyne, about $0.2 \times 10^{-13}$ cm$^2$/dyne, about $0.3 \times 10^{-13}$ cm$^2$/dyne, about $0.4 \times 10^{-13}$ cm$^2$/dyne, about $0.5 \times 10^{-13}$ cm$^2$/dyne, about $0.6 \times 10^{-13}$ cm$^2$/dyne, about $0.7 \times 10^{-13}$ cm$^2$/dyne, about $0.8 \times 10^{-13}$ cm$^2$/dyne, about $0.9 \times 10^{-13}$ cm$^2$/dyne, about $1.0 \times 10^{-13}$ cm$^2$/dyne, about $1.1 \times 10^{-13}$ cm$^2$/dyne, about $1.2 \times 10^{-13}$ cm$^2$/dyne, about $1.3 \times 10^{-13}$ cm$^2$/dyne, about $1.4 \times 10^{-13}$ cm$^2$/dyne, about $1.5 \times 10^{-13}$ cm$^2$/dyne, about $1.6 \times 10^{-13}$ cm$^2$/dyne, about $1.7 \times 10^{-13}$ cm$^2$/dyne, about $1.8 \times 10^{-13}$ cm$^2$/dyne, about $1.9 \times 10^{-13}$ cm$^2$/dyne, or about $2 \times 10^{-13}$ cm$^2$/dyne.

The above modulus and the photoelastic coefficient can be realized through adjustment of the material and thickness of the retardation layer 30, particularly the positive C layer, the material and thickness of the first protective layer 20, or the elongation direction and ratio of the first protective layer 20.

The laminate of the first protective layer 20 and the retardation layer 30 may be formed on the other surface of the polarizer 10 opposite to the second protective layer 40 and may affect bending when left at high temperature. In the present invention, the polarizing plate can further suppress bending by reducing a modulus variation rate of the laminate of the first protective layer 20 and the retardation layer 30.

In an embodiment, the laminate of the first protective layer 20 and the retardation layer 30 may have a modulus variation rate of about −3% to about 0%, and, in an embodiment, greater than about −3% to about 0%, and, in an embodiment, about −2% to about 0%, as calculated according to the following Equation 1. Within this range, it is possible to suppress generation of bending in the optical laminate or a panel including the optical laminate.

$$\text{Modulus variation rate} = \{(B-A)/A\} \times 100, \quad \text{Equation 1}$$

where, in Equation 1, A denotes modulus of the laminate of the first protective layer and the retardation layer in the absorption axis direction of the polarizer, and B denotes modulus of the laminate of the first protective layer and the retardation layer in the absorption axis direction of the polarizer, as measured after being left at 105° C. for 1 hour.

For example, the laminate of the first protective layer 20 and the retardation layer 30 may have a modulus variation rate of about −3.0%, about −2.9%, about −2.8%, about −2.7%, about −2.6%, about −2.5%, about −2.4%, about −2.3%, about −2.2%, about −2.1%, about −2.0%, about −1.9%, about −1.8%, about −1.7%, about −1.6%, about −1.5%, about −1.4%, about −1.3%, about −1.2%, about −1.1%, about −1.0%, about −0.9%, about −0.8%, about −0.7%, about −0.6%, about −0.5%, about −0.4%, about −0.3%, about −0.2%, about −0.1%, or about 0%, as calculated according to Equation 1.

In an embodiment, in Equation 1, modulus B of the laminate is less than or equal to modulus A of the laminate and may be in a range of about 2,000 MPa to about 4,000 MPa, and, in an embodiment, about 2,000 MPa to about 3,500 MPa, and, in an embodiment, about 2,000 MPa to about 3,000 MPa. For example, the laminate may have a modulus B of about 2,000 MPa, about 2,100 MPa, about 2,200 MPa, about 2,300 MPa, about 2,400 MPa, about 2,500 MPa, about 2,600 MPa, about 2,700 MPa, about 2,800 MPa, about 2,900 MPa, about 3,000 MPa, about 3,100 MPa, about 3,200 MPa, about 3,300 MPa, about 3,400 MPa, about 3,500 MPa, about 3,600 MPa, about 3,700 MPa, about 3,800 MPa, about 3,900 MPa, or about 4,000 MPa.

The modulus variation rate of Equation 1 may be realized through adjustment in modulus of the laminate of the first protective layer 20 and the retardation layer 30, the material and thickness of the retardation layer 30, particularly the positive C layer, the material and thickness of the first protective layer 20, or the elongation direction and ratio of the first protective layer 20.

In an embodiment, the laminate of the first protective layer 20 and the retardation layer 30 may have an out-of-plane retardation of −200 nm to 0 nm at a wavelength of 550 nm, and, in an embodiment, −200 nm to less than 0 nm, and, in an embodiment, −180 nm to −5 nm, and, in an embodiment, −150 nm to −50 nm, and, in an embodiment, −90 nm to −75 nm. Within this range, the laminate can improve the contrast ratio at opposite angles while suppressing light leakage. For example, the laminate of the first protective layer 20 and the retardation layer 30 may have an out-of-plane retardation of about −200 nm, about −195 nm, about −190 nm, about −185 nm, about −180 nm, about −175 nm, about −170 nm, about −165 nm, about −160 nm, about −155 nm, about −150 nm, about −145 nm, about −140 nm, about −135 nm, about −130 nm, about −125 nm, about −120 nm, about −115 nm, about −110 nm, about −105 nm, about −100 nm, about −95 nm, about −90 nm, about −85 nm, about −80 nm, about −75 nm, about −70 nm, about −65 nm, about −60 nm, about −55 nm, about −50 nm, about −45 nm, about −40 nm, about −35 nm, about −30 nm, about −25 nm, about −20 nm, about −15 nm, about −10 nm, about −5 nm, or about 0 nm at a wavelength of 550 nm.

In an embodiment, the laminate of the first protective layer 20 and the retardation layer 30 may have an in-plane retardation Re of 20 nm or less at a wavelength of 550 nm, and, in an embodiment, 0 nm to 20 nm, and, in an embodiment, 0 nm to 10 nm. Within this range, the laminate can easily achieve the above out-of-plane retardation. For example, the laminate of the first protective layer 20 and the retardation layer 30 may have an in-plane retardation Re of about 20 nm, about 19 nm, about 18 nm, about 17 nm, about 16 nm, about 15 nm, about 14 nm, about 13 nm, about 12 nm, about 11 nm, about 10 nm, about 9 nm, about 8 nm, about 7 nm, about 6 nm, about 5 nm, about 4 nm, about 3 nm, about 2 nm, about 1 nm, or about 0 nm at a wavelength of 550 nm.

In an embodiment, the laminate of the first protective layer 20 and the retardation layer 30 may have a thickness of about 10 μm to about 60 μm, and, in an embodiment, about 20 μm to about 50 μm. Within this range, the laminate can be applied to the optical laminate. For example, the laminate of the first protective layer 20 and the retardation layer 30 may have a thickness of about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, or about 60 μm.

First Protective Layer

The first protective layer 20 is directly formed on the retardation layer 30. Here, "directly formed on" means that neither a bonding layer nor an adhesive layer is interposed between the first protective layer 20 and the retardation layer 30.

The first protective layer 20 may be stretched to have a certain out-of-plane retardation (e.g., a predetermined out-of-plane retardation) and a certain in-plane retardation (e.g., a predetermined in-plane retardation), thereby suppressing generation of bending through axial alignment with the absorption axis of the polarizer 10 without affecting improvement in contrast ratio at opposite angles and suppression of light leakage due to the retardation layer 30.

In an embodiment, the first protective layer 20 may have an out-of-plane retardation about −5 nm or less at a wavelength of 550 nm, and, in an embodiment, about −50 nm to about −10 nm, and, in an embodiment, about −30 nm to about −10 nm. Within this range, the first protective layer 20 can improve visibility at right and left sides without obstructing the functions of the retardation layer. For example, the first protective layer 20 may have an out-of-plane retardation of about −50 nm, about −49 nm, about −48 nm, about −47 nm, about −46 nm, about −45 nm, about −44 nm, about −43 nm, about −42 nm, about −41 nm, about −40 nm, about −39 nm, about −38 nm, about −37 nm, about −36 nm, about −35 nm, about −34 nm, about −33 nm, about −32 nm, about −31 nm, about −30 nm, about −29 nm, about −28 nm, about −27 nm, about −26 nm, about −25 nm, about −24 nm, about −23 nm, about −22 nm, about −21 nm, about −20 nm, about −19 nm, about −18 nm, about −17 nm, about −16 nm, about −15 nm, about −14 nm, about −13 nm, about −12 nm, about −11 nm, about −10 nm, about −9 nm, about −8 nm, about −7 nm, about −6 nm, or about −5 nm at a wavelength of 550 nm.

In an embodiment, the first protective layer 20 may have an in-plane retardation of about 0 nm to about 20 nm at a wavelength of 550 nm, and, in an embodiment, about 0 nm to about 10 nm. Within this range, the first protective layer 20 can improve visibility at opposite sides without obstructing the functions of the retardation layer. For example, the first protective layer 20 may have an in-plane retardation of about 0 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, or about 20 nm at a wavelength of 550 nm.

Next, a relationship between the absorption axis of the polarizer 10 and the slow axis of the first protective layer 20 in the optical laminate will be described.

The slow axis of the first protective layer 20 is substantially orthogonal to the absorption axis of the polarizer 10. With this relationship, the first protective layer 20 can easily realize the above retardation values while assisting in suppression of bending of the optical laminate. Here, "substantially orthogonal" means that an angle defined between the absorption axis of the polarizer 10 and the slow axis of the first protective layer 20 is in a range of about 80° to about 95°, and, in an embodiment, about 90°. For example, the angle defined between the absorption axis of the polarizer 10 and the slow axis of the first protective layer 20 may be about 80°, about 81°, about 82°, about 83°, about 84°, about 85°, about 86°, about 87°, about 88°, about 89°, about 90°, about 91°, about 92°, about 93°, about 94°, or about 95°.

In an embodiment, the slow axis of the first protective layer 20 may correspond to the transverse direction (TD) of the first protective layer 20. With this structure, the absorption axis of the polarizer 10 is substantially parallel to the machine direction (MD) of the first protective layer 20, whereby the laminate of the first protective layer 20 and the retardation layer 30 can be manufactured through a roll-to-roll process, thereby improving processability and productivity.

The first protective layer 20 may include an optically transparent resin film. In an embodiment, the first protective layer 20 may be formed of at least one resin selected from among cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, polyvinylidene chloride, and acryl resins, without being limited thereto. In an embodiment, the first protective layer 20 is a film formed of a cellulose resin including triacetylcellulose and the like, or an acryl resin, and, in an embodiment, an acryl resin.

In an embodiment, the first protective layer 20 may have a thickness of greater than about 0 μm to about 100 μm or less, and, in an embodiment, about 10 μm to about 60 μm, and, in an embodiment, about 20 μm to about 50 μm. Within this range, the first protective layer 20 can be applied to the optical laminate. For example, the first protective layer 20 may have a thickness of about 0.001 μm, about 0.005 μm, about 0.01 μm, about 0.02 μm, about 0.03 μm, about 0.04 μm, about 0.05 μm, about 0.06 μm, about 0.07 μm, about 0.08 μm, about 0.09 μm, about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, about 60 μm, about 61 μm, about 62 μm, about 63 μm, about 64 μm, about 65 μm, about 66 μm, about 67 μm, about 68 μm, about 69 μm, about 70 μm, about 71 μm, about 72 μm, about 73 μm, about 74 μm, about 75 μm, about 76 μm, about 77 μm, about 78 μm, about 79 μm, about 80 μm, about 81 μm, about 82 μm, about 83 μm, about 84 μm, about 85 μm, about 86 μm, about 87 μm, about 88 μm, about 89 μm, about 90 μm, about 91 μm, about 92 μm, about 93 μm, about 94 μm, about 95 μm, about 96 μm, about 97 μm, about 98 μm, about 99 μm, or about 100 μm.

The first protective layer 20 may be a film stretched to a certain elongation (e.g., a predetermined elongation).

In an embodiment, in an in-plane direction of the first protective layer 20, an axis having a low index of refraction may correspond to the machine direction (MD) of the first protective layer, and an axis having a high index of refraction may correspond to the transverse direction (TD) of the first protective layer. In this case, the first protective layer may be a TD uniaxially stretched protective film or a TD uniaxially stretched coating layer.

In another embodiment, in the in-plane direction of the first protective layer 20, the axis having a low index of refraction may correspond to the transverse direction (TD) of the first protective layer and the axis having a high index of refraction may correspond to the machine direction (MD) of the first protective layer. In this case, the first protective layer may be an MD uniaxially stretched protective film or an MD uniaxially stretched coating layer.

In a further embodiment, in the in-plane direction of the first protective layer 20, the axis having a low index of refraction may correspond to an oblique direction with respect to the transverse direction of the first protective layer, and the axis having a high index of refraction may correspond to an oblique direction with respect to the machine direction of the first protective layer. In this case, the first protective layer may be an MD and TD biaxially stretched protective film or an MD and TD uniaxially stretched coating layer.

In an embodiment, in the in-plane direction of the first protective layer 20, the axis having a low index of refraction corresponds to the machine direction (MD) of the first protective layer 20, and the axis having a high index of refraction corresponds to the transverse direction (TD) of the first protective layer 20, whereby the optical laminate can be manufactured through a roll-to-roll process in consideration of an axial relationship between the retardation layer 30 and the polarizer 10, thereby improving processability and productivity. The following description will focus on this structure.

In an embodiment, the first protective layer 20 may include a TD uniaxially stretched protective film to have the axis having a low index of refraction and the axis having a high index of refraction in the in-plane direction of the first protective layer.

Upon TD uniaxial stretching, the first protective film 20 may be manufactured by a method of manufacturing the first protective film 20, which includes: performing melt-extrusion of a resin for the first protective film 20 and stretching the resin to an elongation of about 100% to about 200% an initial TD width of the resin only in the transverse direction thereof, preferably about 120% to about 140%. Within this range of elongation, the first protective layer 20 can have the axis having a low index of refraction and the axis having a high index of refraction.

Stretching may be realized by at least one of dry stretching and wet stretching and may be performed at a temperature of about (Tg−20)° C. to about (Tg+50)° C. with reference to the glass transition temperature Tg of the resin for the first protective film 20, and, in an embodiment, about 70° C. to about 250° C., and, in an embodiment, about 80° C. to about 200° C., and, in an embodiment, about 100° C. to about 200° C. Within this range, uniform stretching can be achieved. For example, stretching may be performed at a temperature of about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C., about 91° C., about 92° C., about 93° C., about 94° C., about 95° C., about 96° C., about 97° C., about 98° C., about 99° C., about 100° C., about 105° C., about 110° C., about 115° C., about 120° C., about 125° C., about 130° C., about 135° C., about 140° C., about 145° C., about 150° C., about 155° C., about 160° C., about 165° C., about 170° C., about 175° C., about 180° C., about 185° C., about 190° C., about 195° C., about 200° C., about 205° C., about 210° C., about 215° C., about 220° C., about 225° C., about 230° C., about 235° C., about 240° C., about 245° C., or about 250° C.

In an embodiment, although not shown in FIG. 1, the polarizer 10 may be bonded to the first protective layer 20 via a bonding layer. The bonding layer may be formed of a typical bonding agent, such as a water-based bonding agent, a photocurable bonding agent, and the like, which are well-known to those skilled in the art.

Polarizer

The polarizer 10 includes an absorption type polarizer that divides incident light into two polarized components orthogonal to each other to transmit one polarized light component while absorbing the other polarized light component.

In an embodiment, in an in-plane direction of the polarizer, an axis having a high index of refraction may correspond to an absorption axis of the polarizer and an axis having a low index of refraction may correspond to a transmission axis of the polarizer.

In an embodiment, the absorption axis of the polarizer may correspond to the machine direction (MD) thereof and the transmission axis of the polarizer may correspond to the transverse direction (TD) thereof.

In an embodiment, the polarizer 10 may have a light transmittance of about 40% or more, and, in an embodiment, about 40% to about 45%. In an embodiment, the polarizer 10 may have a degree of polarization of about 95% or more, and, in an embodiment, about 95% to about 100%, and, in an embodiment, about 98% to about 100%. Within this range, the polarizer 10 can further improve front contrast and durability.

The polarizer 10 may include a uniaxially stretched polarizer containing dichroic dyes.

In an embodiment, the polarizer containing dichroic dyes may include a polarizer manufactured through MD uniaxial stretching of a base film for polarizers, followed by dyeing the base film with the dichroic dyes (for example, iodine or iodine-containing potassium iodide). The base film for polarizers may include a polyvinyl alcohol film or a derivative thereof, without being limited thereto. The polarizer may be manufactured by a typical method known to those skilled in the art.

In an embodiment, the polarizer 10 may have a thickness of about 1 μm to about 40 μm, and, in an embodiment, about 5 μm to about 30 μm, and, in an embodiment, about 10 μm to about 25 μm. Within this range, the polarizer 10 can be used in the optical laminate. For example, the polarizer 10 may have a thickness of about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, or about 40 μm.

In an embodiment, although not shown in FIG. 1, the polarizer 10 may be bonded to the first protective layer 20 via a bonding layer. The bonding layer may be formed of a typical bonding agent, such as a water-based bonding agent, a photocurable bonding agent, and the like, which are well-known to those skilled in the art.

Second Protective Layer

The second protective layer 40 may be disposed on a light exit surface of the polarizer 10 to screen light emitted from the polarizer, thereby improving screen quality and/or protecting the polarizer 10.

The second protective layer 40 may include a protective film or a protective coating layer.

The protective film is an optically transparent film and may be a film formed of at least one selected from among, for example, cellulose resins including triacetylcellulose (TAC) and the like, polyester resins including polyethylene terephthalate (PET), polybutylene terephthalate, polyethylene naphthalate (PEN), polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins, without being limited thereto. In an embodiment, the protective film may be a TAC film or a PET film. The protective coating layer may be formed of at least one selected from among a heat-curable composition and a photocurable composition.

In an embodiment, the second protective layer 40 may have an in-plane retardation Re of about 5,000 nm or more at a wavelength of 550 nm, and, in an embodiment, about 5,000 nm to about 15,000 nm, and, in an embodiment, about 5,000 nm to about 12,000 nm. Within this range, the second protective layer 40 can improve front contrast while suppressing generation of mura.

In an embodiment, the second protective layer 40 may have an out-of-plane retardation Rth of about 6,000 nm or more at a wavelength of 550 nm, and, in an embodiment, about 6,000 nm to about 15,000 nm, and, in an embodiment, about 6,000 nm to about 12,000 nm. Within this range, the second protective layer 40 can suppress generation of spots due to birefringence while securing improvement in viewing angle in a liquid crystal display.

In an embodiment, the second protective layer 40 may have a degree of biaxiality (NZ) of about 2.5 or less at a wavelength of 550 nm, and, in an embodiment, about 1.0 to about 2.2, and, in an embodiment, about 1.2 to about 2.0, and, in an embodiment, about 1.4 to about 1.8. Within this range, the second protective layer 40 can suppress generation of spots due to birefringence while maintaining mechanical strength thereof. For example, the second protective layer 40 may have a degree of biaxiality (NZ) of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5 at a wavelength of 550 nm.

In an embodiment, the second protective layer 40 may have a thickness of about 100 μm or less, and, in an embodiment, greater than about 0 μm to about 70 μm or less, and, in an embodiment, about 5 μm to about 70 μm, and, in an embodiment, about 15 μm to about 80 μm. Within this range, the second protective layer 40 can be used in the optical laminate. For example, the second protective layer 40 may have a thickness of about 0.01 μm, about 0.05 μm, about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, about 60 μm, about 61 μm, about 62 μm, about 63 μm, about 64 μm, about 65 μm, about 66 μm, about 67 μm, about 68 μm, about 69 μm, about 70 μm, about 71 μm, about 72 μm, about 73 μm, about 74 μm, about 75 μm, about 76 μm, about 77 μm, about 78 μm, about 79 μm, about 80 μm, about 81 μm, about 82 μm, about 83 μm, about 84 μm, about 85 μm, about 86 μm, about 87 μm, about 88 μm, about 89 μm, about 90 μm, about 91 μm, about 92 μm, about 93 μm, about 94 μm, about 95 μm, about 96 μm, about 97 μm, about 98 μm, about 99, or about 100 μm.

In an embodiment, although not shown in FIG. 1, functional coating layers may be further formed on an upper surface of the second protective layer 40 to provide additional functions to the optical laminate. For example, the functional coating layers may include any of a hard-coating layer, an anti-fingerprint layer, an antireflection layer, an antiglare layer, a low reflectivity layer, and the like. These may be used alone or in combination thereof.

In an embodiment, although not shown in FIG. 1, the polarizer 10 may be bonded to the second protective layer 40 via a bonding layer. The bonding layer may be formed of a typical bonding agent, such as a water-based bonding agent, a photocurable bonding agent, and the like, which are well-known to those skilled in the art.

In an embodiment, the optical laminate may have a modulus of about 2,000 MPa to about 5,000 MPa, and, in an embodiment, about 2,000 MPa to about 4,000 MPa, as measured in the absorption axis direction of the polarizer. Within this range, the optical laminate can realize the effects of the present invention.

In an embodiment, the optical laminate may have a modulus of about 1,000 MPa to about 3,000 MPa, and, in an embodiment, about 1,000 MPa to about 2,000 MPa, as measured in a direction of the transmission axis of the polarizer. Within this range, the optical laminate can realize the effects of the present invention. The modulus of the optical laminate may be measured substantially by the same method of measuring the modulus of the laminate of the first protective layer 20 and the retardation layer 30 described above.

In an embodiment, the optical laminate according to the present invention may further include a third protective layer. In an embodiment, the third protective layer may be formed on a light incidence surface of the polarizer.

Next, an optical laminate according to another embodiment of the present invention will be described with reference to FIG. 2.

Figure 2:
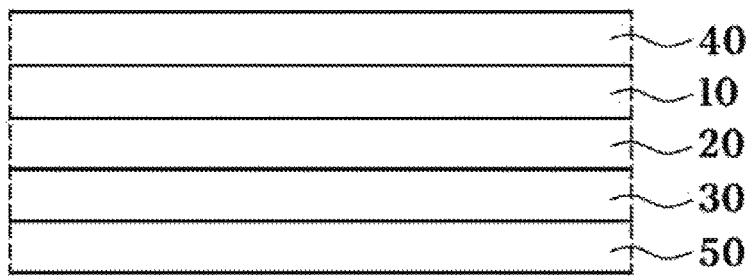
FIG. 2 is a cross-sectional view of an optical laminate according to another embodiment of the present invention.

Referring to FIG. 2, the optical laminate includes a polarizer 10, a first protective layer 20, a retardation layer 30, a second protective layer 40, and a third protective layer 50.

The optical laminate according to this embodiment is substantially the same as the optical laminate according to the above-described embodiment except that the third protective layer 50 is formed on a lower surface of the retardation layer 30. Herein, the following description will focus on the third protective layer 50.

The third protective layer 50 can protect the retardation layer 30 and/or can further improve the contrast ratio at opposite angles while suppressing light leakage.

The third protective layer 50 may include positive A optical characteristics (nx>ny≈nz, where nx, ny, and nz are the indexes of refraction of the third protective layer in the slow axis direction, the fast axis direction, and the thickness direction thereof at a wavelength of 550 nm, respectively). According to the present invention, the third protective layer 50 exhibits the positive A optical characteristics, and the retardation layer includes at least the positive C layer, thereby further improving the contrast ratio at opposite angles while suppressing light leakage.

In an embodiment, the third protective layer 50 may have an in-plane retardation Re of about 10 nm to about 150 nm at a wavelength of 550 nm, and, in an embodiment, about 30 nm to about 130 nm, and, in an embodiment, about 50 nm to about 130 nm. Within this range, the third protective layer 50 can further improve the contrast ratio at opposite angles while suppressing light leakage. For example, the third protective layer 50 may have an in-plane retardation Re of about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, about 100 nm, about 105 nm, about 110 nm, about 115 nm, about 120 nm, about 125 nm, about 130 nm, about 135 nm, about 140 nm, about 145 nm, or about 150 nm at a wavelength of 550 nm.

The third protective layer 50 may include at least one selected from among a protective film, a protective coating layer, and a liquid crystal panel.

The protective film may be an optically transparent film and may be formed of at least one selected from among, for example, cellulose resins including triacetylcellulose (TAC) and the like, polyester resins including polyethylene terephthalate (PET), polybutylene terephthalate, polyethylene naphthalate (PEN), polybutylene naphthalate, and the like, cyclic polyolefin resins, polycarbonate resins, polyether sulfone resins, polysulfone resins, polyamide resins, polyimide resins, polyolefin resins, polyacrylate resins, polyvinyl alcohol resins, polyvinyl chloride resins, and polyvinylidene chloride resins, without being limited thereto. In an embodiment, the protective film may be a TAC film or a PET film.

The protective coating layer may be formed of at least one selected from among a heat-curable composition and a photocurable composition.

The liquid crystal panel allows change in alignment of liquid crystals depending upon application of a voltage such that light emitted from a light source can pass therethrough. The liquid crystal panel does not require a positive A retardation layer in the optical laminate, thereby enabling thickness reduction of a liquid crystal display.

The liquid crystal panel may include a pair of substrates and a liquid crystal layer interposed between the substrates and acting as a display medium. One substrate (color filter substrate) is provided with a color filter and a black matrix, and the other substrate (active matrix substrate) is provided with a switching element (for example, TFT) for controlling electrical and optical properties of liquid crystals, and signal lines and pixel lines for supplying gate signals to the switching element, without being limited thereto.

In an embodiment, the liquid crystal panel may adopt in-plane switching (IPS) mode liquid crystals. As a result, the liquid crystal display can improve viewing angle characteristics.

In an embodiment, the liquid crystal panel may have an in-plane retardation of about 60 nm to about 150 nm at a wavelength of 550 nm, and, in an embodiment, about 70 nm to about 120 nm. Within this range, the liquid crystal panel can assist in improvement in viewing angle characteristics. For example, the liquid crystal panel may have an in-plane retardation of about 60 nm, about 65 nm, about 70 nm, about 75 nm, about 80 nm, about 85 nm, about 90 nm, about 95 nm, about 100 nm, about 105 nm, about 110 nm, about 115 nm, about 120 nm, about 125 nm, about 130 nm, about 135 nm, about 140 nm, about 145 nm, or about 150 nm at a wavelength of 550 nm.

The in-plane retardation of the liquid crystal panel may be controlled through adjustment in thickness of the liquid crystal layer in the liquid crystal panel.

An optical display apparatus according to the present invention includes the optical laminate according to an embodiment of the present invention. In an embodiment, the optical display apparatus may include an IPS liquid crystal display.

The liquid crystal display includes a liquid crystal panel, the optical laminate according to an embodiment of the present invention stacked on a light exit surface of the liquid crystal panel, and a polarizing plate (light source-side polarizing plate) stacked on a light incidence surface of the liquid crystal panel. The polarizing plate on the light incidence surface may include a polarizing plate well known to those skilled in the art. The optical laminate according to the present invention may be used as a viewer-side polarizing plate.

The liquid crystal display includes a light source on a lower surface of the light source-side polarizing plate. The light source may include a light source having a continuous luminous spectrum. For example, the light source may include a white LED light source, a quantum dot (QD) light source, a metal fluoride red phosphor light source, and, in an embodiment, a KSF ($K_2SiF_6$:$Mn^{4+}$) phosphor or KTF ($K_2TiF_6$:$Mn^{4+}$) phosphor-containing light source, and the like. The liquid crystal panel may be a vertical alignment mode panel, without being limited thereto.

Next, the present invention will be described in more detail with reference to some examples. However, it should be noted that these examples are provided for illustration and should not be construed in any way as limiting the invention.

Example 1

A polyvinyl alcohol film (VF-TS #4500, thickness: 45 μm, Kuraray Co., Ltd.) was uniaxially stretched to two times an initial length thereof at 30° C. in the MD thereof, dyed with iodine, and stretched in an aqueous solution of boric acid at 60° C., thereby preparing a polarizer having a thickness of 17 μm.

A positive C layer was formed on a lower surface of an acryl film by coating a composition for the positive C layer (cellulose ester, Eastman Co., Ltd.) to a predetermined thickness on the lower surface of the acryl film (thickness: 40 μm, Re: 5 nm and Rth: −17 nm at 550 nm, TD uniaxially stretched film, Hyosung Co. Ltd.), followed by drying at 80° C. for 10 min. The positive C layer had a thickness of 5 μm. Details of a laminate of the acryl film and the positive C layer are shown in Table 1.

An upper surface of the acryl film was bonded to a lower surface (light incidence surface) of the prepared polarizer. Then, an optical laminate was manufactured by bonding a polyethylene terephthalate (PET) film (thickness: 80 μm, Re: 8,500 nm and Rth: 9,300 nm at 550 nm, TD uniaxially stretched film, Toyobo Co., Ltd.) to an upper surface (light exit surface) of the polarizer. The absorption axis of the polarizer (MD of the polarizer) was orthogonal to the TD of the acryl film.

Examples 2 and 3

Optical laminates were manufactured in the same manner as in Example 1 except that details of the laminate of the acryl film and the positive C layer were changed as listed in Table 1.

Example 4

An optical laminate was manufactured in the same manner as in Example 1 except that a positive A layer was further formed on a lower surface of the positive C layer.

Comparative Examples 1 to 4

Optical laminates were manufactured in the same manner as in Example 1 except that details of the laminate of the acryl film and the positive C layer were changed as listed in Table 1.

The laminates of the acryl film and the positive C layer manufactured in the Examples and Comparative Examples were evaluated as to properties listed in Table 1.

(1) Photoelastic coefficient (unit: $\times 10^{-13}$ $cm^2$/dyne): Photoelastic coefficient was measured at 25° C. and at a wavelength of 550 nm. The laminate was cut into a rectangular specimen having a size of 15 mm×250 mm in MD×TD of the acryl film. With a weight attached to the specimen, in-plane retardation of the specimen at a wavelength of 550 nm according to load (x-axis) was measured (y-axis, measurement with Axoscan) while changing load applied to the specimen by changing the weight from 0 N to 100 N, 200 N, 300 N, 400 N, 500 N, 600 N, 700 N, 800 N, 900 N, and 1,000 N, followed by obtaining a graph. Then, the photoelastic coefficient was calculated based on a gradient of the graph.

(2) Out-of-plane retardation (Rth) at a wavelength of 550 nm (unit: nm): Out-of-plane retardation of the laminate at a wavelength of 550 nm was measured by Axoscan.

(3) Modulus (unit: MPa): The laminate was cut into a rectangular specimen having a size of 25 mm×150 mm in MD×TD of the acryl film. With a distance between jigs set to 100 mm, tensile fracture testing was performed using UTM (Universal Testing Machine, Instron)/Bluehill. In a graph in which tensile strain (%) is indicated by the x-axis and tensile strength (MPa) is indicated by the y-axis, modulus was calculated based on a gradient of the graph in a rising section at an initial stage.

Condition for Measurement of Tensile Modulus

Measurement instrument: UTM (Universal Testing Machine, Instron)/Bluehill

Measurement condition: tensile rate: 100 mm/min, measurement temperature: 25° C.

(4) Modulus variation rate (unit: %): A specimen was prepared in the same method as in (3) and modulus (A) was measured in the same method as in (3). After the specimen was left at 105° C. for 1 hour, modulus (B) was measured in the same method as in (3). A modulus variation rate was calculated according to Equation 1.

The optical laminates of the Examples and Comparative Examples were evaluated as to properties listed in Table 1.

(1) Mura in panel: The optical laminate was cut into a square specimen having a size of 100 mm×100 mm in MD×TD of the polarizer and was bonded to an upper surface of a glass plate (thickness: 10 mm) to be used as a viewer-side polarizing plate. A light source-side polarizing plate having a laminate of triacetylcellulose film-polarizer-triacetylcellulose film was attached to a lower surface of the glass plate. A backlight unit was disposed on a lower side of the light source-side polarizing plate, thereby preparing a specimen for measurement of mura.

Generation of mura was observed with the naked eye by comparing a panel in which a 300 g metal weight was not placed on the upper surface of the optical laminate with the panel in which the 300 g metal weight was placed on the upper surface of the optical laminate. A panel generating no mura was rated as x, a panel generating significant mura was rated as ○, and a panel generating severe mura to provide poor screen quality was rated as ◉.

(2) Bending variation (unit: mm): The optical laminate was cut to a size of 219.8 mm×124.15 mm in MD×TD of the polarizer and was bonded to a glass plate (length×width× thickness: 224.8 mm×129.15 mm×5 mm) to prepare a specimen.

The specimen was placed on a flat bottom surface such that the PET film of the specimen was placed at the uppermost side. A bent height from the bottom surface to each of twelve measurement points of the specimen was measured at 25° C. and an average height of two points having maximum heights was calculated. Then, after the specimen was left at 60° C. for 240 hours, an average height was calculated by the same method. Thereafter, bending variation was calculated based on a difference between the average heights. A bending variation of 2.50 mm or less indicating good reliability at high temperature was rated as ◉, a bending variation of greater than 2.50 mm to 2.60 mm indicating normal reliability at high temperature was rated as ○, a bending variation of greater than 2.60 mm to 2.70 mm indicating poor reliability at high temperature was rated as Δ, a bending variation of greater than 2.70 mm indicating very poor reliability at high temperature was rated as x.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Photoelastic coefficient | 2 | 1 | 0 | 2 | 9 | 10 | 2 | 3 |
| Rth | −70 | −90 | −80 | −70 | −77 | −80 | −80 | −60 |
| Modulus | 2800 | 2700 | 2500 | 2800 | 4200 | 4300 | 4200 | 2800 |

TABLE 1-continued

|  | Example | | | | Comparative Example | | | |
| --- | --- | --- | --- | --- | --- | --- | --- | --- |
|  | 1 | 2 | 3 | 4 | 1 | 2 | 3 | 4 |
| Modulus (after being left at 105° C. for 1 hour) | 2760 | 2660 | 2450 | 2760 | 4050 | 4030 | 4050 | 2760 |
| Modulus variation rate | −1.4 | −1.5 | −2.0 | −1.4 | −3.6 | −6.3 | −3.6 | −1.4 |
| Mura | X | X | X | X | ○ | ◉ | X | ○ |
| Bending variation | ◉ | ◉ | ◉ | ◉ | Δ | X | Δ | ◉ |

As shown in Table 1, the optical laminates according to the present invention minimized or reduced generation of mura and bending by reducing the bending variation due to stress applied to a panel of an optical display apparatus upon assembly of the optical laminate to the panel thereof. In addition, although not shown in Table 1, the optical laminates according to the present invention improved the contrast ratio at opposite angles while suppressing light leakage when applied to the panel of the optical display apparatus.

Conversely, the optical laminates of the Comparative Examples failed to satisfy the conditions for the present invention and could not provide the effects of the present invention.

Although some embodiments have been described herein, it should be understood that various modifications, changes, alterations, and equivalent embodiments can be made by those skilled in the art without departing from the spirit and scope of the present invention.

What is claimed is:

1. An optical laminate comprising:
    a polarizer; and
    a first protective layer and a retardation layer that are sequentially stacked on a light incidence surface of the polarizer,
    wherein the retardation layer comprises at least a positive C layer, and a laminate of the first protective layer and the retardation layer has a photoelastic coefficient of about $2 \times 10^{31}$ $^{13}$ cm$^2$/dyne or less and a modulus of about 2,000 MPa to about 4,000 MPa, as measured in an absorption axis direction of the polarizer in the optical laminate,
    wherein the laminate of the first protective layer and the retardation layer has a modulus variation rate of about −3% to about 0%, as calculated according to the following Equation 1:

Modulus variation rate=${(B-A)/A}\times 100$, where, in Equation 1, A denotes the modulus of the laminate of the first protective layer and the retardation layer in the absorption axis direction of the polarizer, and B denotes a modulus of the laminate of the first protective layer and the retardation layer in the absorption axis direction of the polarizer, as measured after being left at 105° C. for 1 hour.

2. The optical laminate according to claim 1, wherein the laminate of the first protective layer and the retardation layer has an out-of-plane retardation of about −200 nm to about 0 nm or less at a wavelength of 550 nm.

3. The optical laminate according to claim 1, wherein the laminate of the first protective layer and the retardation layer has an in-plane retardation of about 20 nm or less at a wavelength of 550 nm.

4. The optical laminate according to claim 1, wherein the positive C layer has an out-of-plane retardation Rth of about −200 nm to about 0 nm at a wavelength of 550 nm.

5. The optical laminate according to claim 1, wherein the positive C layer has an in-plane retardation of about 20 nm or less at a wavelength of 550 nm.

6. The optical laminate according to claim 1, wherein the positive C layer comprises a liquid crystal layer or a non-liquid crystal coating layer.

7. The optical laminate according to claim 6, wherein the non-liquid crystal coating layer comprises at least one selected from among a cellulose ester compound or a polymer thereof and an aromatic compound or a polymer thereof.

8. The optical laminate according to claim 1, wherein the first protective layer has an out-of-plane retardation of about −5 nm or less at a wavelength of 550 nm.

9. The optical laminate according to claim 1, wherein the first protective layer has an in-plane retardation of about 0 nm to about 20 nm at a wavelength of 550 nm.

10. The optical laminate according to claim 1, wherein the first protective layer comprises a triacetylcellulose resin film or an acryl resin film.

11. The optical laminate according to claim 1, wherein an angle defined between an absorption axis of the polarizer and a slow axis of the first protective layer is about 80° to about 95°.

12. The optical laminate according to claim 11, wherein the slow axis of the first protective layer is a transverse direction (TD) of the first protective layer.

13. The optical laminate according to claim 1, further comprising a second protective layer stacked on a light exit surface of the polarizer.

14. The optical laminate according to claim 13, wherein the second protective layer has an in-plane retardation of about 5,000 nm or more at a wavelength of 550 nm.

15. The optical laminate according to claim 1, further comprising: a third protective layer stacked on the light incidence surface of the polarizer.

16. The optical laminate according to claim 15, wherein the third protective layer exhibits positive A optical characteristics.

17. The optical laminate according to claim 15, wherein the third protective layer comprises at least one of a protective film, a protective coating layer, and a liquid crystal panel.

18. An optical display apparatus comprising the optical laminate according to claim 1.

* * * * *